United States Patent [19]

Sugino et al.

[11] Patent Number: 5,654,511

[45] Date of Patent: Aug. 5, 1997

[54] RAIL AXIAL-FORCE MEASURING METHOD AND AN AXIAL-FORCE MEASURABLE RAIL

[75] Inventors: Kazuo Sugino, Fukuoka; Hiroaki Sakamoto; Toru Inaguma, both of Kawasaki, all of Japan

[73] Assignee: Nippon Steel Corporation, Tokyo, Japan

[21] Appl. No.: 557,049

[22] PCT Filed: Apr. 7, 1995

[86] PCT No.: PCT/JP95/00695

§ 371 Date: Nov. 30, 1995

§ 102(e) Date: Nov. 30, 1995

[87] PCT Pub. No.: WO95/27888

PCT Pub. Date: Oct. 19, 1995

[30] Foreign Application Priority Data

Apr. 8, 1994 [JP] Japan .................. 6-070367

[51] Int. Cl.⁶ .................................................. G01B 7/00
[52] U.S. Cl. ........................... 73/779; 73/786; 324/209
[58] Field of Search ................. 73/779, 786; 324/209

[56] References Cited

U.S. PATENT DOCUMENTS

| | | | |
|---|---|---|---|
| 3,427,872 | 2/1969 | Leep et al. | 73/779 |
| 4,596,150 | 6/1986 | Kuhr | 324/209 |
| 4,599,563 | 7/1986 | Tiitto et al. | 73/779 |

FOREIGN PATENT DOCUMENTS

| | | |
|---|---|---|
| 0125064 | 11/1984 | European Pat. Off. . |
| 0195434 | 9/1986 | European Pat. Off. . |
| 0270122 | 6/1988 | European Pat. Off. . |
| 0287873 | 10/1988 | European Pat. Off. . |
| 58-213903 | 12/1983 | Japan . |
| 60-243525 | 12/1985 | Japan . |
| 2202630 | 9/1988 | United Kingdom . |

OTHER PUBLICATIONS

Patent Abstracts of Japan, vol. 16, No. 537 (C-1003), Nov. 6, 1992 & JP-A-04 202626 (Nippon Steel Corp.), Jul. 23, 1992.

Database Inspec Institute of Electrical Engineers, Stevenage, GB, Inspec No. 1477797, Aug. 1979, XP002020339 & Archiv Fur Das Eisenhuttenwesen, Aug. 1979, West Germany, vol. 50, No. 8, pp. 347–350, V. Hauk, et al., "X-ray elasticity constants of ferritic, austenitic and hardened steels" ISSN 0003-8962.

Primary Examiner—Richard Chilcot
Assistant Examiner—Ronald Biegel
Attorney, Agent, or Firm—Kenyon & Kenyon

[57] ABSTRACT

A rail axial-force measuring method and an axial-force measurable rail which eliminate the effects of residual stresses existing in a rail and thus enables an axial force acting on the rail to be measured quickly and accurately are provided. The rail is provided with a stress sensing portion which is magnetized by a magnetizing head, and changes in the magnetization of the stress sensing portion are detected by a detection head as a voltage signal from which an axial force acting on the rail is measured. Preferably, the voltage signal is a Barkhausen noise signal and, also preferably, the stress sensing portion is constructed from a portion formed by first locally heating the rail into a γ-phase region, and then causing cementite to precipitate by heat treatment at a temperature lower than the γ-phase region. The axial-force measurable rail including the above-described stress sensing portion is also provided.

6 Claims, 3 Drawing Sheets

RAIL AXIAL-FORCE MEASURING METHOD AND AN AXIAL-FORCE MEASURABLE RAIL

TECHNICAL FIELD

The present invention relates to a rail axial-force measuring method by which an axial force acting on a laid rail can be nondestructively measured in the field using magnetic techniques, and also relates to an axial-force measurable rail.

BACKGROUND ART

It has been traditionally practiced to nondestructively test structural members for material qualities, stresses, etc. by utilizing the dependence of the magnetic properties of materials on strain, structures such as crystal grain size and precipitates, etc. Such traditional methods include, for example, a method for estimating the tensile strength of steel by measuring its magnetic permeability and a method for estimating quenched hardness by measuring coercive force. In recent years, methods utilizing Barkhausen noise resulting from discontinuities in magnetization have been attracting attention, and there have been proposed a variety of methods utilizing this phenomenon; among them are a method of estimating the fatigue strength of soft steel (proposed, for example, by L. P. Karjalainen et al., IEEE Trans. Mag. MAG 16,514 (1980)) and a method of estimating the toughness of tool steel (proposed, for example, by Nakai et al., Iron and Steel, 75,833 (1989)).

To measure the magnetic permeability, coercive force, or Barkhausen noise of a body, an apparatus is used that comprises a power supply, a magnetization system consisting of a magnetizing head, etc., and a detection system consisting of a detection head, a signal processing system, etc. An advantage of the head system is that a body to be measured can be magnetized simply by touching the head to the surface of the body, for the detection of a signal from the body.

Using such magnetic techniques, attempts have been made to measure the stresses (axial forces) acting on a laid rail. Rails are constantly subjected to expansion and contraction due to changes in ambient temperatures, but usually the expansion and contraction of the rails are restrained except at portions near joints, since the rails are held rigidly to the crossties with fasteners. As a result, a compressive stress or a tensile stress acts locally on the rail. Since buckling may be caused in the rail when the compressive stress exceeds a certain critical value, it is particularly important in track maintenance to diagnose these axial forces. For this purpose, various techniques have been proposed for nondestructively detecting the axial forces acting on laid rails. For example, Japanese Unexamined Patent Publication No. 60-17330 discloses a rail axial-stress measuring apparatus which ensures reproducibility by demagnetizing the portions of a rail to be measured by a demagnetizer before measuring axial stresses using a magnetically anisotropic sensor. In this apparatus, the head and foot of a rail are taken as the portions to be measured. Further, Japanese Unexamined Patent Publication No. 60-243526 discloses a rail axial-stress measuring apparatus in which a pair of magnetically anisotropic sensors are arranged with their magnetically anisotropic detection coils differentially connected to eliminate the effects of external magnetic field disturbances. However, rails usually have residual stresses of varying magnitude locked into them before they were laid, and the magnitude of such stresses may be greater than the value of the axial forces, depending on the site within the rail. Using the apparatus disclosed in Japanese Unexamined Patent Publication No. 60-17330 or 60-243526, therefore, the absolute magnitude of the axial forces acting on the rail once it has been laid cannot be measured correctly unless the magnitude of residual stresses in the portion to be measured is obtained in advance.

The two prior art methods described above measure the change of permeability caused by stresses. Methods or apparatus for measuring stresses using other magnetic parameters are also disclosed, which include an apparatus for measuring stresses from the rate of change of coercive force (Japanese Unexamined Patent Publication No. 50-159787), a sensor, used in a stress and defect detection apparatus, for detecting Barkhausen noise by using a ferrite core having a rounded tip (Japanese Unexamined Patent Publication No. 60-57247), a method and apparatus in which measurement accuracy for stresses is enhanced by using Barkhausen noise in combination with acoustic emission (Japanese Unexamined Patent Publication No. 59-112257), and a method and apparatus for measuring stresses and mechanical properties by obtaining magnetic hysteresis curves using a flux meter (Japanese Unexamined Patent Publication No. 02-262026). However, none of the methods and apparatus disclosed above makes any mention of the measurement of axial forces acting on rails. Furthermore, by using any of these methods or apparatus, axial forces acting on a rail cannot be measured since the magnetic parameter of the rail composition itself changes little due to the axial forces. Moreover, by using any of these methods, the absolute magnitude of stresses cannot be obtained correctly because the values of the detected stresses are magnified by the residual stresses existing in the body to be measured.

As described above, when diagnosing axial forces acting on a laid rail by using magnetic techniques, with any prior art method or apparatus the absolute magnitude of axial forces acting on the laid rail cannot be obtained from the field measurements alone, because residual stresses were locked into the rail before it was laid. To obtain the absolute magnitude of such axial forces after the rail was laid, the prior art requires that the value of a magnetic signal induced by the residual stresses in the portion to be measured be measured and recorded in advance and be subtracted from the result of actual measurement. For a rail already laid, however, prerecording the values of the residual-stress-induced magnetic signals would not only be practically infeasible since there are an enormous number of portions to be measured, but it would also be difficult to align the magnetic head accurately with the same premeasured portion.

It is accordingly an object of the present invention to provide a rail axial-force measuring method which can measure axial forces acting on a rail quickly and accurately by measuring magnetic signals obtained from stress sensing portions provided on the rail and thereby eliminating the effects of residual stresses existing in the rail. It is another object of the invention to provide a rail that permits the measurement of axial forces acting on it.

DISCLOSURE OF THE INVENTION

A summary of the present invention will be given below. The present invention provides the following:

1. A rail axial-force measuring method, comprising the steps of providing a rail with a stress sensing portion, magnetizing the stress sensing portion by a magnetizing head, detecting a change in magnetization of the stress sensing portion by a detection head as a voltage signal, and measuring an axial force acting on the rail from the voltage signal.

2. A rail axial-force measuring method as described in item 1 above, wherein the magnetization is alternating-current magnetization by the magnetizing head and the voltage signal to be detected by the detection head is frequency-filtered to extract a Barkhausen noise signal.

3. A rail axial-force measuring method as described in item 1 or 2 above, wherein the stress sensing portion is formed by first locally heating the rail into a γ-phase region, and then causing cementite to precipitate by heat treating the locally heated portion at a temperature lower than the γ-phase region.

4. A rail axial-force measuring method as described in item 1 or 2 above, wherein a stress sensing piece is attached to the rail, the stress sensing piece being produced by first heating a material having the same composition as the rail into a γ-phase region, and then causing cementite to precipitate by heat treatment at a temperature lower than the γ-phase region.

5. An axial-force measurable rail, comprising a stress sensing portion.

6. An axial-force measurable rail as described in item 5 above, wherein the stress sensing portion consists of a portion formed by first heating, the portion into a γ-phase region, and then causing cementite to precipitate, in the portion by heat treatment at a temperature lower than the γ-phase region.

7. An axial-force measurable rail as described in item 5 above, wherein a stress sensing piece, which is produced by first heating a material having the same composition as the rail into a γ-phase region, and then causing cementite to precipitate by heat treatment at a temperature lower than the γ-phase region, is attached to the rail.

The stress sensing portion can be formed by first locally heating the rail into the γ-phase region by a high-frequency heating process or by using a laser or the like, and then causing cementite to precipitate by heat treatment at a temperature lower than the γ-phase region. Alternatively, a stress sensing piece may be attached to the rail by welding or other means; the stress sensing piece can be produced by first heating a material having the same composition as the rail into the γ-phase region, and then causing cementite to precipitate.

The present invention will be described in detail below. The stress sensing portion is required to possess the following properties: first, a magnetic signal from the sensing portion is highly responsive to a stress and the magnitude of the stress is readable from the signal with good accuracy, and secondly, the magnetic signal obtained from the stress sensing portion is distinguishable from any magnetic signal obtained from the rail base material.

It was discovered that by using a rail provided at prescribed intervals along its longitudinal direction with stress sensing portions formed by heat treating the rail and causing cementite to precipitate in α-Fe, the magnitude of stress can be determined from a magnetic signal obtained from each sensing portion in a stress range where diagnosis is required. It was also discovered that the magnetic signal obtained from each stress sensing portion was easily distinguishable from any magnetic signal obtained from the rail base material. The stress sensing portion structure can be formed, for example, by first locally heating the rail in the γ-phase region to transform carbon to solid solution, and then by rapidly cooling it to form a supersaturated solid solution such as martensite, the supersaturated solid solution then being tempered at a temperature lower than the γ-phase region, causing cementite to precipitate onto α-Fe grains, or by heat treating it at a temperature lower than the γ-phase region instead of performing rapid cooling.

These stress sensing portions can be formed by applying localized heat treatment to the rail by using a high-frequency heating process or a laser. Alternatively, stress sensing pieces may be attached directly to the rail, which are produced by first heating a sheet-like or rod-like material having the same composition as the rail in the γ-phase region to transform carbon to solid solution, and then by rapidly cooling it to form a supersaturated solid solution such as martensite, the supersaturated solid solution then being tempered at a temperature lower than the γ-phase region, causing cementite to precipitate onto α-Fe grains, or by heat treating it at a temperature lower than the γ-phase region instead of performing rapid cooling. A simple method of attaching the sensing pieces is by welding which can also provide sufficient joint strength and which allows axial forces acting on the rail to be transmitted directly to the stress sensing pieces. However, since the welding method can change the composition of the welded portion by welding heat, the size of each sensing piece must be made larger than the magnetic head by the size of the portion affected by welding heat. Alternatively, the stress sensing pieces may be attached to the rail by using an adhesive.

The stress sensing portions can be formed on the head, on the web, or on the foot of the rail, among which the web is preferred, because the rail head is where the effects of vibrations by wheels are strongly felt and the foot is where fasteners could form obstructions. These sensing portions are formed on the outside, the inside, or on both sides of the rail track, as required. When forming the sensing portions only on one side of the track, it is desirable that at least one sensing portion be provided between each crosstie. Instead of providing one sensing portion between each crosstie, the sensing portions may be provided at intervals of two to twenty crossties, for example. In this case, measurement accuracy drops but the intended purpose of measuring axial forces can be served. When forming the sensing portions on both sides of the track, it is desirable that at least two sensing portions be provided between each crosstie. Instead of providing them between each crosstie, the sensing portions may be provided at intervals of two to twenty crossties, for example.

Using the rail provided with the above-described stress sensing portions, the effects of residual stresses originally existing in the rail are eliminated and the absolute magnitude of axial forces acting on the rail can be measured with high accuracy in the field.

The magnetic signals that the magnetic head detects from the stress sensing portions represent permeability, coercive force, and various other properties. Any signal can be used as long as it has correlation with the stress detected by the stress sensing portion. It was discovered that Barkhausen noise, resulting from discontinuous changes in magnetization and picked up by the stress sensing portion, has correlation with axial forces in the intended stress range of 0 to 12 $kg/mm^2$, and also that the waveform of that Barkhausen noise is different from the Barkhausen noise of the rail base material, making it easy to distinguish one from the other. Furthermore, it was discovered that the Barkhausen noise of the rail base material is unaffected by axial forces. Accordingly, by using Barkhausen noise as the magnetic signal, axial forces can be measured quickly and accurately.

To detect magnetic signals such as Barkhausen noise from the stress sensing portion, the stress sensing portion is magnetized by alternating current by a magnetizing head, and the change in the magnetization is detected by a detection head. A voltage signal (voltage-time waveform) proportional to the change of magnetization is induced in the detection head. After amplification, the voltage signal is fed to a band-pass filter through which only a signal in the desired frequency range is passed, thus obtaining a Barkhausen noise signal. The Barkhausen noise can be also obtained if the voltage signal is first band-pass-filtered and then amplified. Signals other than Barkhausen noise can be obtained by performing prescribed processing on the voltage signal through an electrical circuit.

Field detection of axial forces acting on a laid rail is performed in the following manner. A magnetic head consisting of a magnetizing head and a detection head is suspended from a track maintenance car so that the magnetic head is positioned at a prescribed distance from a stress sensing portion. Demagnetizing equipment containing a demagnetizing power supply and detection equipment containing a signal processing circuit, or equipment containing demagnetizing and detection equipment in one compact unit, are loaded in the maintenance car. The equipment and the magnetic head are connected by coaxial cable or the like. By constructing a measuring system in this manner, axial forces acting on rails can be measured online. Besides online measurement, it is also possible for track maintenance staff to take the measuring system to the site and measure axial forces acting on rails in a specific section.

As described above, the axial-force measurable rail is provided with stress sensing portions, and magnetic signals from the stress sensing portions are detected using a measuring system consisting of a magnetic head, a demagnetizing system, and a detection system. With this arrangement, the effects of residual stresses originally existing in the rail are eliminated and the absolute magnitude of the axial forces actually acting on the rail can be measured with good accuracy in the field. The invention will be described in further detail below by way of examples.

BEST MODE FOR CARRYING OUT THE INVENTION

Example 1

Figure 1:
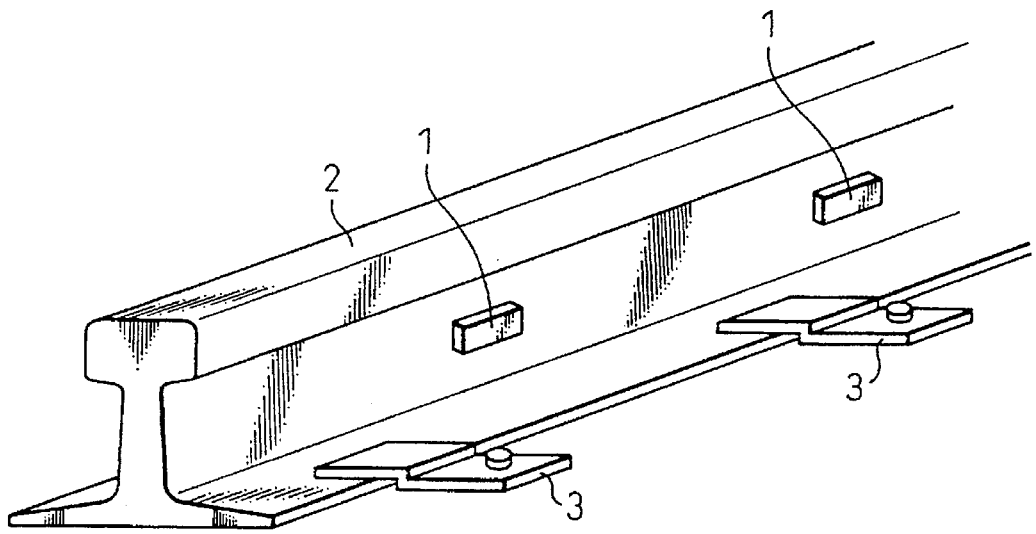
FIG. 1 is a perspective view showing the external appearance of a rail according to one example of the invention.

Stress sensing pieces were made by applying the following heat treatment to a material having the same composition as a common steel rail. Each sensing piece was 15 mm in width, 45 mm in length, and 1 mm in thickness. The material was held in a nonoxidizing atmosphere for one hour in a γ-phase region of 900° C., after which it was cooled by water to form martensite. After that, the material was tempered at 700° C., causing spherical cementite to precipitate. The thus-made stress sensing pieces were attached by welding to the webs of two common steel rails, each 25 meters in length, that were experimentally laid outdoors. The sensing pieces were attached to both sides of the paired rails, one piece on each side between each crosstie, in a longitudinally central section, about 5 meters long, of the rails. Attaching of the sensing pieces was performed when the rail temperature was 20° C., and both ends of each rail were restrained so that the rail could not move due to thermal expansion. A schematic diagram of the thus produced rail for axial force measurement is shown in FIG. 1, in which the stress sensing pieces are indicated at 1, the rail at 2 and fasteners at 3.

A magnetizing head having a U-shaped silicon steel core with a magnetizing coil wound around it and a magnetic head consisting of a detection head having an air-core detection coil were used to measure Barkhausen noise on the stress sensing pieces 1. The magnetizing frequency was set at 2.5 Hz, and a detected voltage signal was frequency-filtered for detection in a frequency range of 1–5 kHz. Noncontacting testing was conducted with a liftoff of 0.6 mm.

Figure 2:
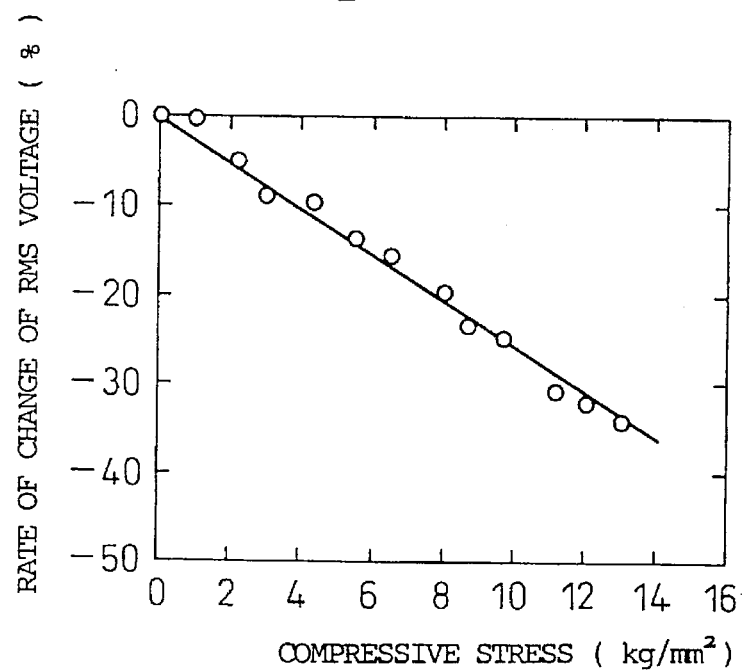
FIG. 2 is a graph showing the relationship between the compressive stress, obtained from the measurement of Barkhausen noise, and the rate of change of rms voltage according to one example of the invention.
Figure 3:
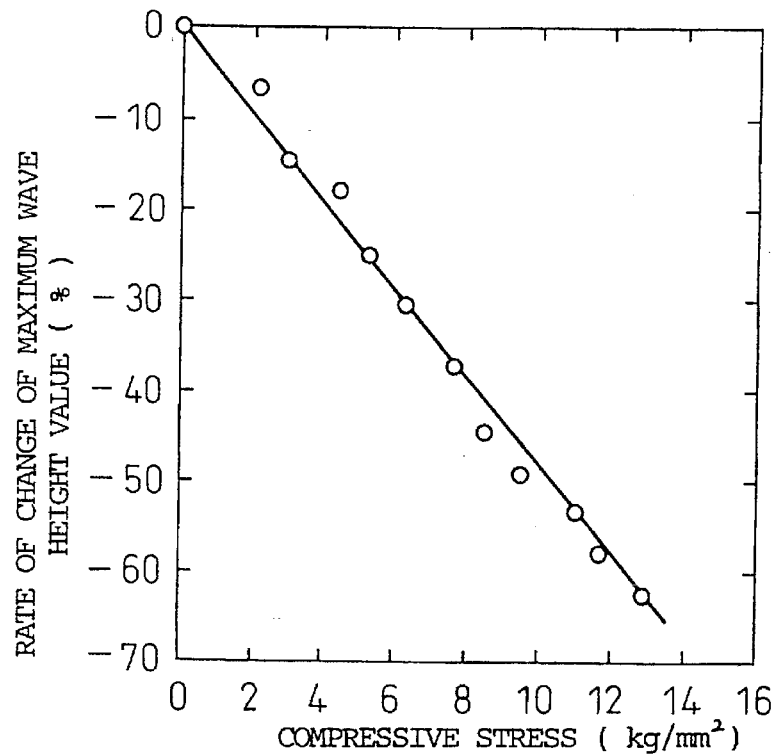
FIG. 3 is a graph showing the relationship between the compressive stress, obtained from the measurement of Barkhausen noise, and the rate of change of maximum wave height value according to one example of the invention.

Prior to making measurements on the test rail, a calibration curve of the stress sensing piece was obtained in the following way. First, a stress sensing piece, the same one as the sensing piece 1 described above, was attached by welding to the web of a common steel rail cut to 1 m length to prepare a preliminary test piece, and with a compressive stress applied to it using a compression tester, the Barkhausen noise was measured on the stress sensing piece. The relationship between the compressive stress and the rate of change of rms voltage, and the relationship between the compressive stress and the rate of change of maximum wave height value, are shown in FIGS. 2 and 3, respectively. As can be seen from these figures, both rms voltage and maximum wave height value show linear relationships with respect to the compressive stress, and using either calibration curve, the magnitude of the compressive stress (axial force) can be measured with good accuracy.

Barkhausen noise from the stress sensing pieces attached to the 25 meters long rails experimentally laid was actually measured on a clear mid-summer day, to see whether the evaluation of axial force was possible. During the measurement, the rail temperature rose to 46° C. but buckling did not occur. The rate of change of the rms voltage of the Barkhausen noise and the rate of change of the maximum wave height value of the same obtained at that time showed approximately the same values, −15% and −28% respectively, for any sensing piece. When these values were plotted on the respective calibration curves in FIGS. 2 and 3, the value of axial force obtained was 5.8 kg/mm², which agreed with the value of axial force calculated from the thermal expansion and Young's modulus of the rails. It was therefore found that rail axial forces can be measured by the method of the invention whichever value, rms voltage or maximum wave height value, is used.

A similar experiment was conducted on a high-strength rail, in which case also it was found that rail axial forces can be measured by the method of the invention, as in the case of the common steel rails.

Example 2

Using the same test rails and preliminary test rail as used in the first example, a test was conducted to see whether an axial force could be measured from a maximum value of a voltage signal waveform (nonfiltered) induced in the detection head. The maximum value of the voltage signal waveform corresponds to the magnitude of the magnetic permeability of the sensing piece. The same magnetizing head and the same magnetizing conditions as used in the first example were used, but the detection head was constructed from a U-shaped permalloy core with a detection coil wound around it.

Figure 4:
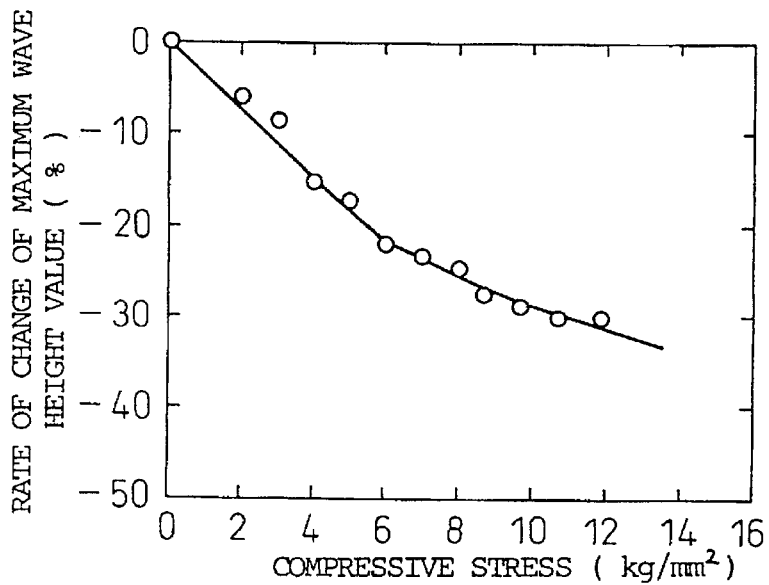
FIG. 4 is a graph showing the dependence of the maximum value of a voltage signal waveform on the compressive stress according to one example of the invention.

Using a compression tester, a compressive stress was applied to the preliminary test rail and the maximum value of the voltage signal waveform was obtained. The resulting calibration curve is shown in FIG. 4. As can be seen from the figure, there is good correlation between the two quantities, which indicates that the magnitude of the compressive stress (axial force) can be measured with good accuracy.

The maximum values of the voltage signal waveforms obtained from the stress sensing pieces attached to the 25 meters long rails experimentally laid were actually measured on a clear mid-summer day, to see whether the evaluation of axial force was possible. During the measurement, the rail temperature rose to 45° C. but buckling did not occur. The rate of change of the maximum value of the voltage signal waveform obtained at that time showed approximately the same value, −21%, for any sensing piece. When this value was plotted on the calibration curve in FIG. 4, the value of axial force obtained was 5.5 kg/mm$^2$, which substantially agreed with the value of axial force calculated from the thermal expansion and Young's modulus of the rails. It was thus found that rail axial forces can be measured by the method of the invention.

A similar experiment was conducted on a high-strength rail, in which case also it was found that rail axial forces can be measured by the method of the invention, as in the case of the common steel rails.

Example 3

Stress sensing pieces were made in the same way as described in the first example. Rails 500 meters in total length (25 meters long rails×20), laid for a steel material freight car on the premises of the present applicant's factory, were used as the test rails, and the sensing pieces (200 pieces in total) were attached by welding to the outer sides of the paired rails at intervals of about 5 meters (one for every seven crossties). Attaching of the sensing pieces was performed when the rail temperature was 20° C.

When the rail temperature rose to 43° C. due to the rise in the ambient temperature and exposure to direct sunlight, the rms voltage of the Barkhausen noise was measured on each stress sensing piece, in the same way as described in the first example. After that, the measured values were converted to axial force by using the calibration curve of FIG. 2. Within each 25-m rail (with five sensing pieces attached to it), approximately the same change was observed at any position. Typical examples are shown in Table 1.

Further, when the rail temperature was 20° C., a commercially available strain gauge was attached to the rail web at a position about 5 mm directly above each stress sensing piece, and the tensile strain ($\epsilon_R$) of the rail was measured in the field. The difference between the value thus measured and the strain value ($\epsilon_t$) in the absence of stress calculated by multiplying the rail temperature increase ΔT (°C.) by the thermal expansion coefficient, was multiplied by Young's modulus (E) to calculate the stress ($E(\epsilon_R - \epsilon_t)$) acting on the rail. The results obtained from the same positions where the Barkhausen noise was measured are shown in Table 1.

TABLE 1

| 25-m rail number | Detection method | Axial force at each stress sensing portion (kg/mm$^2$) | | | | |
|---|---|---|---|---|---|---|
| | | 1 | 2 | 3 | 4 | 5 |
| 1 | Method of invention | 0 | 1.2 | 1.5 | 0.6 | 0.5 |
| | Strain gauge method | 0.1 | 1.1 | 1.7 | 0.5 | 0.5 |
| 2 | Method of invention | 0.2 | 0.6 | 1.5 | 1.3 | 0.1 |
| | Strain gauge method | 0.2 | 0.8 | 1.3 | 1.4 | 0.2 |
| 3 | Method of invention | 0.1 | 0.4 | 0.9 | 0.5 | 0.4 |
| | Strain gauge method | 0.1 | 0.5 | 1.0 | 0.6 | 0.3 |

(Sensing portions 1 and 5 are near joints)

From the above results, it can be seen that the axial forces detected by the method of the invention and those measured by the stain gauge method show approximately the same values, which indicates that the axial forces acting on laid rails can be measured in the field by the method of the invention. The axial force shows smaller values near joints because the rail is allowed to expand more easily near the joints than at other portions of the rail, with the result that the axial force is relieved near the joints.

Comparative Example 1

Figure 5:
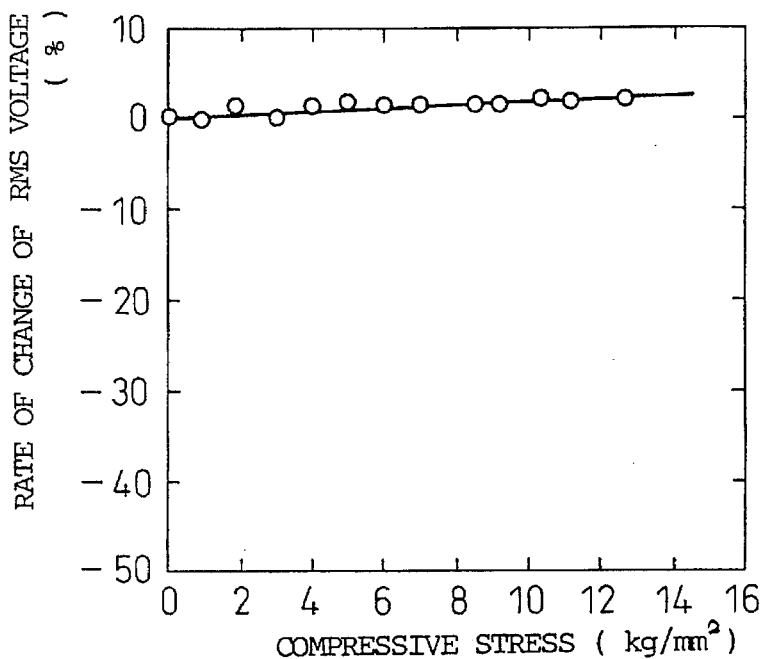
FIG. 5 is a graph showing the relationship between the compressive stress, obtained from the measurement of Barkhausen noise, and the rate of change of rms voltage in a first comparative example.
Figure 6:
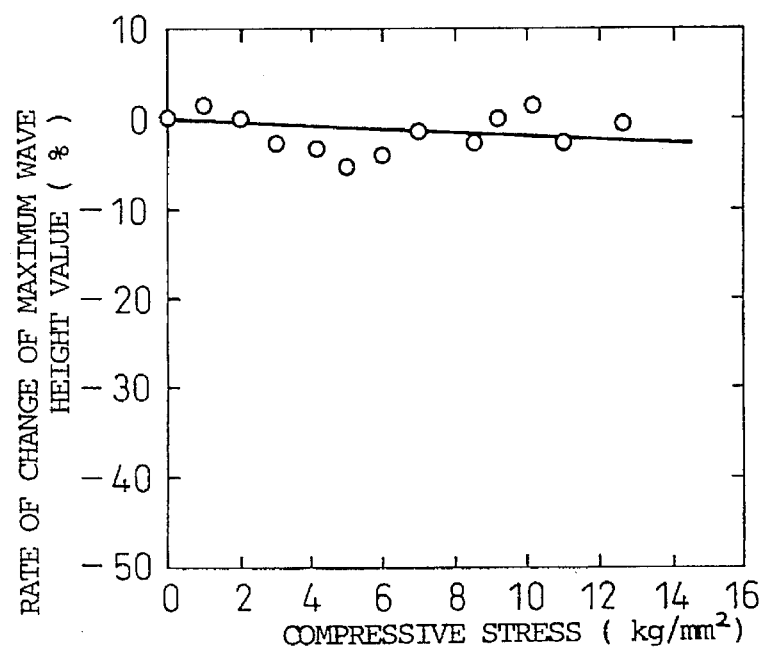
FIG. 6 is a graph showing the relationship between the compressive stress, obtained from the measurement of Barkhausen noise, and the rate of change of maximum wave height value in the first comparative example.

As a comparative example, a 1 meter long common steel rail with no stress sensing portions provided on it was prepared, and with a compressive stress applied to it using a compression tester, Barkhausen noise was measured on the rail web, as in the case of the preliminary test rail prepared in the first example. The measured portion was approximately at the longitudinal center of the rail. The relationship between the compressive stress and the rate of change of rms voltage, and the relationship between the compressive stress and the rate of change of maximum wave height value, are shown in FIGS. 5 and 6, respectively. As can be seen from these figures, both rms voltage and maximum wave height value remain nearly unchanged and are held at substantially constant values despite the change of the compressive stress, which shows that axial forces cannot be measured without using the method of the invention.

Comparative Example 2

The lengthwise distribution of the residual stresses in the webs of the 25-m test rails used in the first example were examined using X-rays before the stress sensing pieces were attached to them. The results showed 2 to 3 kg/mm$^2$ on the average, and over 5 kg/mm$^2$ in some portions. That is, the effects of residual stresses are so great that rail axial forces cannot be measured correctly without using the method of the invention.

As described, using the rail axial-force measuring method and the axial-force measurable rail according to the invention, axial forces could be measured with ease and with good accuracy. Furthermore, the stress sensing portions were almost free of residual stresses, which served to eliminate the effects of the residual stresses originally existing in the rail.

When nondestructively measuring axial forces acting on a laid rail in the field by using magnetic techniques, the effects of the residual stresses existing in the rail can be eliminated and the axial forces acting on the rail can be measured in the field quickly and accurately by using the axial-force measurable rail of the invention and the axial force measuring method using the same.

We claim:

1. A rail axial-force measuring method, comprising the steps of:

(a) providing a rail with a stress sensing portion which is formed by first locally heating said rail into a γ-phase region, and then causing cementite to precipitate by heat treating the locally heated portion at a temperature lower than the γ-phase region, (b) magnetizing the stress sensing portion by a magnetizing head, (c) detecting a change in magnetization of the stress sensing portion by a detection head as a voltage signal, and (d) measuring an axial force acting on the rail from the voltage signal.

2. A rail axial-force measuring method according to claim 1, wherein said magnetization is alternating-current magnetization by the magnetizing head and said voltage signal to be detected by said detection head is frequency-filtered to extract a Barkhausen noise signal.

3. A rail axial-force measuring method according to claim 1, wherein a stress sensing piece is attached to said rail, said stress sensing piece being produced by first heating a material having the same composition as said rail into a γ-phase region, and then causing cementite to precipitate by heat treatment at a temperature lower than the γ-phase region.

4. A rail axial-force measuring method, comprising the steps of:

(a) providing a rail, (b) attaching a stress sensing piece to said rail, said stress sensing piece being produced by first heating a material having the same composition as the rail into a γ-phase region, and then causing cementite to precipitate by heat treatment at a temperature lower than the γ-phase region, (c) magnetizing the stress sensing piece by a magnetizing head, (d) detecting a change in magnetization of the stress sensing piece by a detection head as a voltage signal, and (e) measuring an axial force acting on the rail from the voltage signal.

5. An axial-force measurable rail, comprising a stress sensing portion in said rail, said stress sensing portion produced by first locally heating said rail into a γ-phase region, and then causing cementite to precipitate by heat treating the locally heat treated portion at a temperature lower than the γ-phase region.

6. An axial-force measurable rail, comprising a rail, a stress sensing piece attached to said rail, said stress sensing piece being produced by first heating a material having the same composition as the rail into a γ-phase region, and then causing cementite to precipitate by heat treating at a temperature lower than the γ-phase region.

* * * * *